(12) United States Patent
Pan et al.

(10) Patent No.: US 9,801,406 B2
(45) Date of Patent: Oct. 31, 2017

(54) FOOD DEHYDRATOR

(71) Applicant: TSANN KUEN (ZHANGZHOU) ENTERPRISE CO., LTD., Zhangzhou (CN)

(72) Inventors: Chungho Pan, Zhangzhou (CN); Jiawei Li, Zhangzhou (CN); Xiaorong Zhang, Zhangzhou (CN); Youngshou Chen, Zhangzhou (CN); Ping Lin, Zhangzhou (CN)

(73) Assignee: Tsann Kuen (Zhangzhou) Enterprise Co., Ltd., Zhangzhou, Fujian (CN)

( * ) Notice: Subject to any disclaimer, the term of this patent is extended or adjusted under 35 U.S.C. 154(b) by 0 days.

(21) Appl. No.: 15/175,823

(22) Filed: Jun. 7, 2016

(65) Prior Publication Data

US 2016/0360773 A1 Dec. 15, 2016

(51) Int. Cl.
| | |
|---|---|
| *F26B 3/04* | (2006.01) |
| *A23L 3/40* | (2006.01) |
| *A23B 7/02* | (2006.01) |
| *F26B 9/06* | (2006.01) |

(52) U.S. Cl.
CPC .............. *A23L 3/40* (2013.01); *A23B 7/0205* (2013.01); *F26B 3/04* (2013.01); *F26B 9/066* (2013.01); *A23V 2002/00* (2013.01)

(58) Field of Classification Search
CPC ... F26B 3/04; F26B 9/066; A23L 3/40; A23B 7/0205; A23V 2002/00
USPC ......................................................... 34/197
See application file for complete search history.

(56) References Cited

U.S. PATENT DOCUMENTS

| | | | | | |
|---|---|---|---|---|---|
| 1,594,549 | A | * | 8/1926 | Noel | F26B 9/066 34/196 |
| 2,017,728 | A | * | 10/1935 | Oskamp | F26B 9/066 34/197 |
| 3,805,316 | A | * | 4/1974 | Sheppard | F26B 15/18 15/309.2 |
| 4,380,127 | A | * | 4/1983 | Roberts | A23L 3/40 239/558 |
| 4,536,643 | A | * | 8/1985 | Erickson | A23L 3/40 219/386 |
| 5,802,735 | A | * | 9/1998 | Schoonhoven | F26B 9/066 34/174 |

(Continued)

FOREIGN PATENT DOCUMENTS

| | | | | | |
|---|---|---|---|---|---|
| GB | 572446 | A | * | 10/1945 | ............. F26B 9/066 |
| KR | 200473935 | Y1 | * | 8/2014 | ........... H05B 6/6473 |
| LT | WO 2015047061 | A1 | * | 4/2015 | ............. A01K 59/00 |

*Primary Examiner* — Stephen M Gravini
(74) *Attorney, Agent, or Firm* — LeClairRyan

(57) ABSTRACT

A food dehydrator includes a housing, a blower member, and a plurality of food trays. The housing has an air intake port, a rear chamber disposed downstream of the air intake port, and a front chamber which is disposed downstream of the rear chamber and which has a plurality of dehydration sub-chambers for the food trays to be removably and respectively disposed therein. The blower member is disposed upstream of the air intake port for introducing air into the rear chamber. Each of the food trays is configured to permit the introduced air, which flows through an internal port of a corresponding one of the dehydration sub-chambers, to pass therethrough and leave through an outlet port of the corresponding one of the dehydration sub-chambers.

20 Claims, 13 Drawing Sheets

(56) References Cited

U.S. PATENT DOCUMENTS

| | | | | |
|---|---|---|---|---|
| 5,878,508 | A | * | 3/1999 | Knoll ........................ A01J 11/04 34/197 |
| 6,041,696 | A | * | 3/2000 | Su ........................ A23B 7/0205 34/197 |
| 6,085,442 | A | * | 7/2000 | Erickson .................. A01J 11/04 34/197 |
| D445,295 | S | * | 7/2001 | Su .................................. D7/323 |
| 8,640,357 | B2 | * | 2/2014 | Engin ...................... F26B 3/283 126/21 A |
| 2015/0020404 | A1 | * | 1/2015 | Kim .................... H05B 6/6473 34/265 |

\* cited by examiner

FOOD DEHYDRATOR

CROSS-REFERENCE TO RELATED APPLICATION

This application claims priority from Chinese application no. 201510311611.2, filed on Jun. 9, 2015.

FIELD

The disclosure relates to a dehydrator, more particularly to a dehydrator for dehydrating food, such as fruit and vegetables.

BACKGROUND

With reference to FIG. 1, a conventional food dehydrator is shown to include a housing 9, an air intake pipe 8, and a plurality of food trays 7. The housing 9 includes a rear chamber 91 downstream of the air intake pipe 8, a front chamber 92 downstream of the rear chamber 91, and an outlet port 93 downstream of the front chamber 92. The air intake pipe 8 is disposed to introduce a stream of hot air into the rear chamber 91. The food trays 7 are removably disposed in the front chamber 92. As shown in FIG. 2, each of the food trays 7 has a mesh bottom wall 71 and a surrounding wall 72 extending upwardly from a periphery of the mesh bottom wall 71. The mesh bottom wall 71 and the surrounding wall 72 cooperatively define a dehydration space 73 for dehydration of food. The surrounding wall 72 has an inlet 721 in fluid communication with the rear chamber 91. During dehydration of food, the hot air introduced into the rear chamber 91 flows through the inlets 721 of the food trays 7 into the dehydration spaces 73 of the food trays 7 and then upwardly to pass through the mesh bottom walls 71 of the food trays 7 and leaves the front chamber 92 through the outlet port 93. However, since hot air is introduced into the front chamber 92 through a single air intake pipe 8 and the dehydration spaces 73 of the food trays 7 are in fluid communication with one another, if different food items are dried on the food trays 7 at the same time, the flavors of the food items will mix.

SUMMARY

Therefore, an object of the disclosure is to provide a food dehydrator in which food items on different food trays are dehydrated by different streams of air flow.

According to the disclosure, a food dehydrator includes a housing, a blower member, and a plurality of food trays. The housing has an air intake port, a rear chamber, and a front chamber. The rear chamber is disposed downstream of the air intake port and extends in an upright direction. The front chamber is disposed forwardly of the rear chamber, and has a plurality of dehydration sub-chambers which are displaced from each other in the upright direction. Each of the dehydration sub-chambers has an internal port disposed downstream of the rear chamber and an outlet port for exhaust to the atmosphere. The outlet port is opposite to the internal port in a longitudinal direction transverse to the upright direction, and is disposed downstream of the internal port. The blower member is disposed upstream of the air intake port for introducing air into the rear chamber. Each of the food trays is removably disposed in a corresponding one of the dehydration sub-chambers, and is configured to permit the introduced air, which flows through the internal port of the corresponding one of the dehydration sub-chambers, to pass therethrough and leave through the outlet port of the corresponding one of the dehydration sub-chambers.

BRIEF DESCRIPTION OF THE DRAWINGS

Other features and advantages of the disclosure will become apparent in the following detailed description of the embodiments with reference to the accompanying drawings, in which.

DETAILED DESCRIPTION

Figure 1:
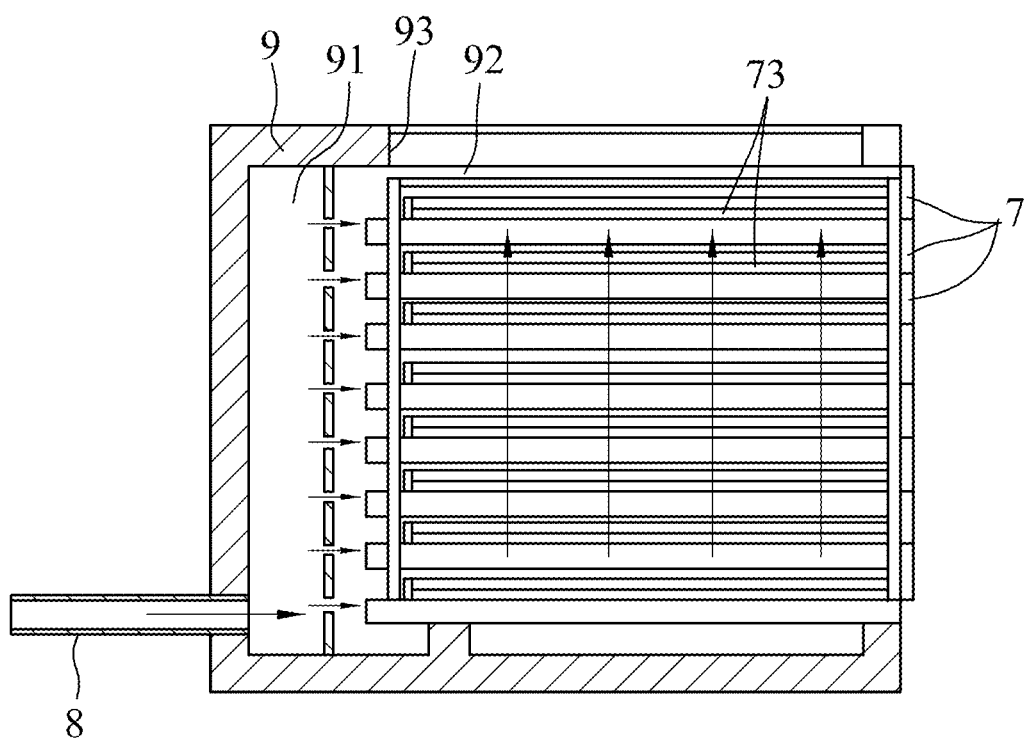
FIG. 1 is a schematic cross-sectional view of a conventional food dehydrator.
Figure 2:
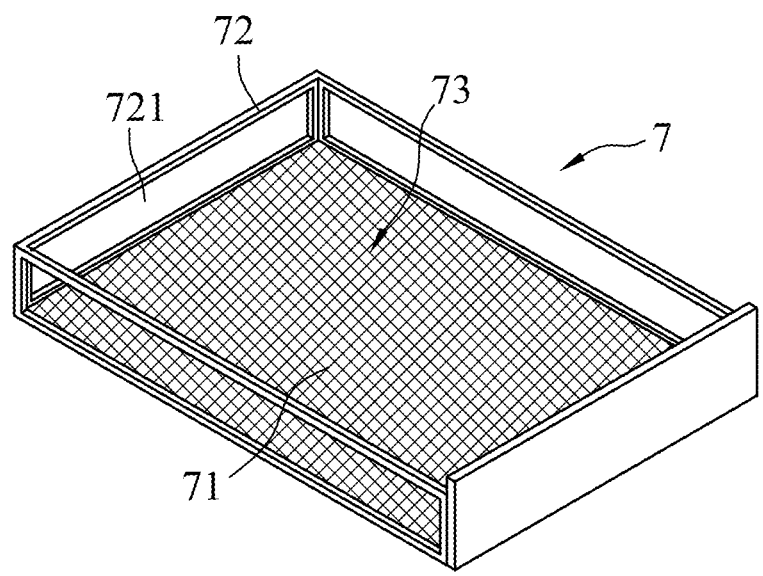
FIG. 2 is a schematic view of a food tray used in the conventional food dehydrator.

Before the disclosure is described in greater detail, it should be noted that like elements are denoted by the same reference numerals throughout the disclosure.

Figure 3:
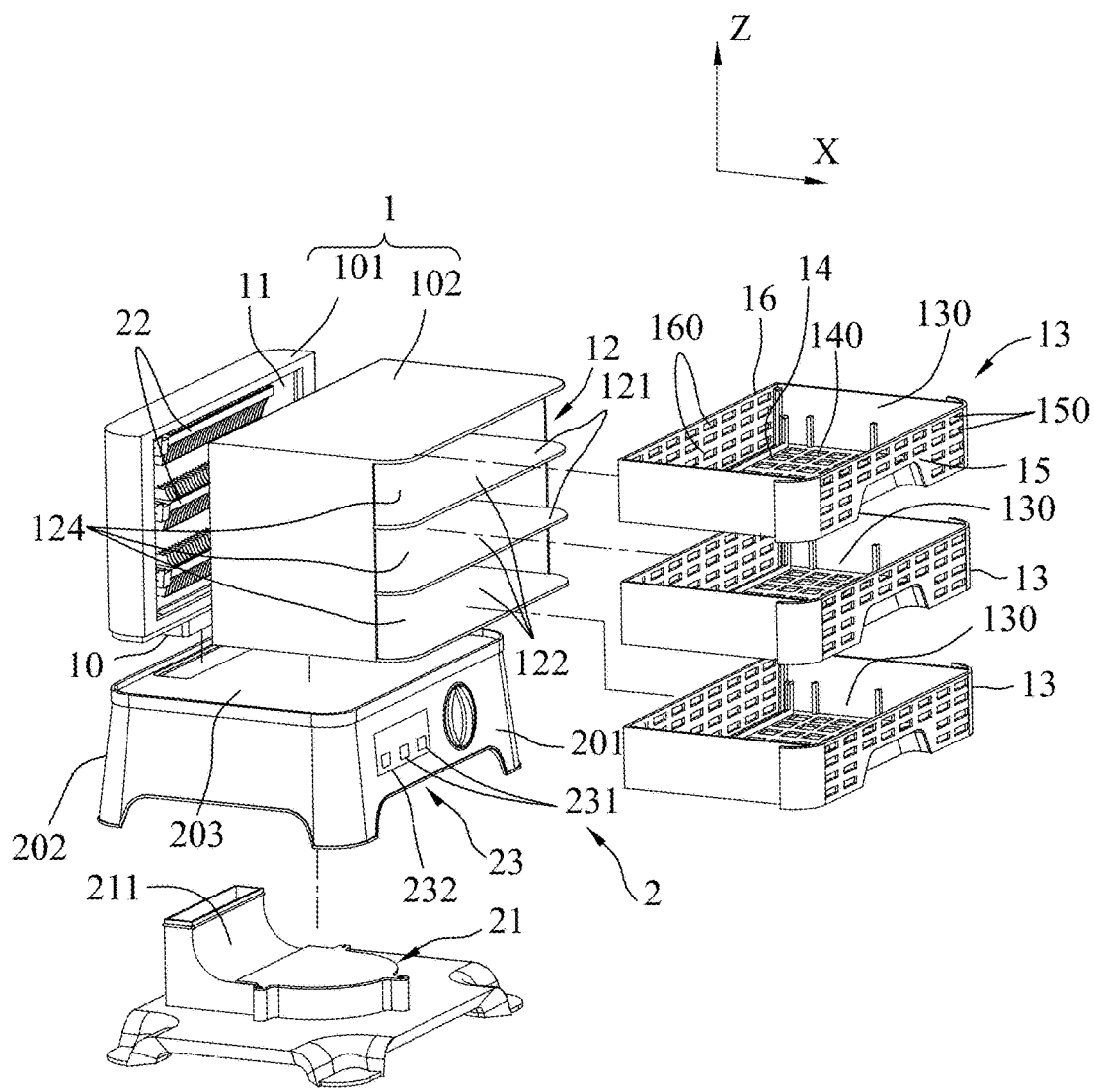
FIG. 3 is an exploded perspective view of a food dehydrator according to a first embodiment of the disclosure.
Figure 4:
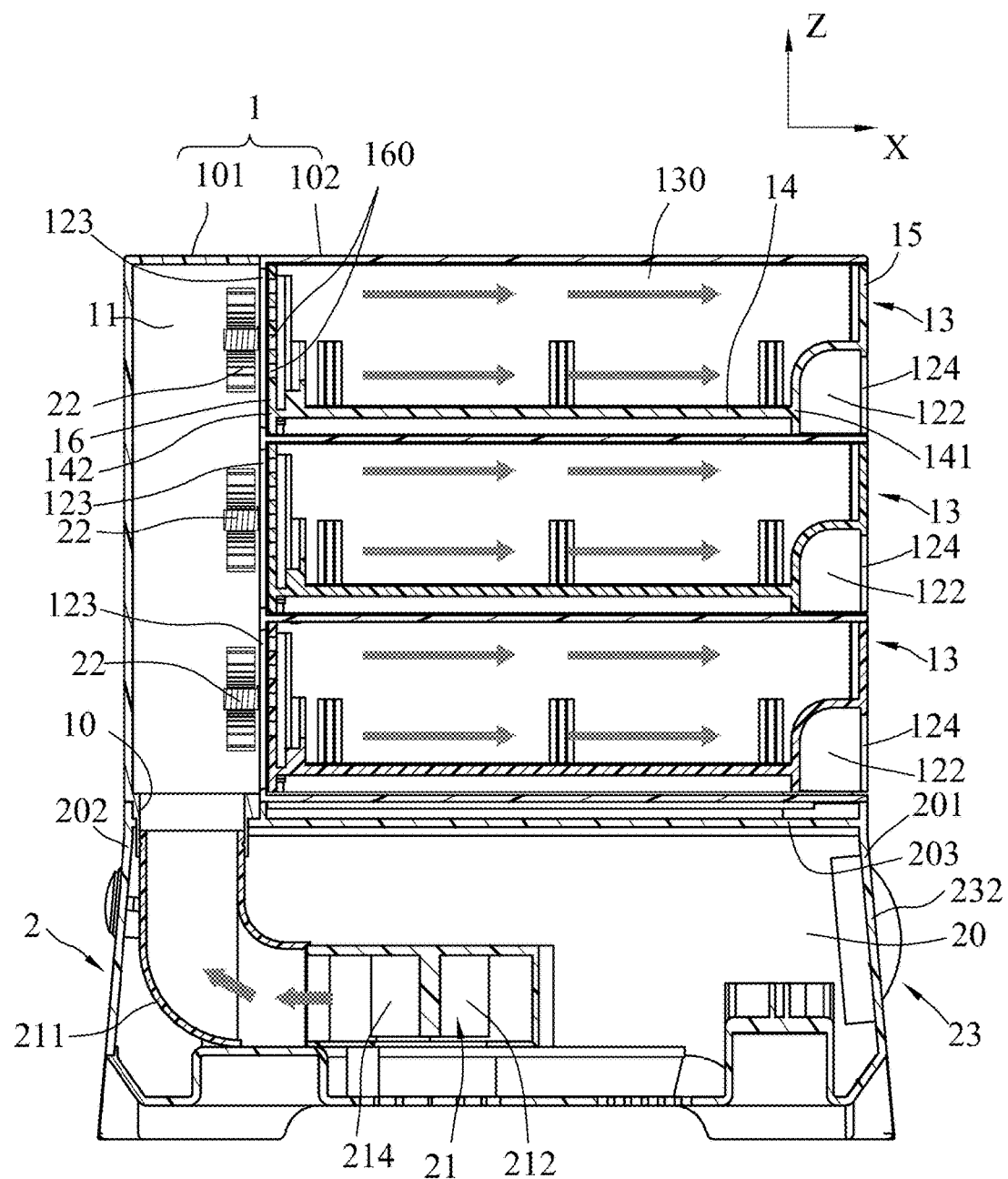
FIG. 4 is a cross-sectional view of the food dehydrator according to the first embodiment of the disclosure.

With reference to FIGS. 3 and 4, a food dehydrator according to a first embodiment of the disclosure is shown to include a housing 1, a blower unit 21, and a plurality of food trays 13.

The housing 1 has an air intake port 10, a rear chamber 11, and a front chamber 12. In this embodiment, the housing 1 has a rear segment 101 defining the rear chamber 11, and a front segment 102 defining the front chamber 12.

The rear chamber 11 is disposed downstream of the air intake port 10, and extends in an upright direction (Z).

The front chamber 12 is disposed forwardly of the rear chamber 11, and has a plurality of dehydration sub-chambers 122 displaced from each other in the upright direction (Z). Each of the dehydration sub-chambers 122 has an internal port 123 disposed downstream of the rear chamber 11, and an outlet port 124 for exhaust to the atmosphere. The outlet port 124 is opposite to the internal port 123 in a longitudinal direction (X) transverse to the upright direction (Z), and is disposed downstream of the internal port 123.

As shown in FIG. 4, the blower unit 21 includes a blower member 212 disposed upstream of the air intake port 10 for introducing air into the rear chamber 11. In this embodiment, the blower member 212 includes a fan 214 and a motor (not shown) disposed to drive the fan 214 so as to draw ambient air into the rear chamber 11.

Each of the food trays 13 is removably disposed in a corresponding one of the dehydration sub-chambers 122, and is configured to permit the introduced air, which flows through the internal port 123 of the corresponding one of the dehydration sub-chambers 122, to pass therethrough and leave through the outlet port 124 of the corresponding one of the dehydration sub-chambers 122, thereby dehydrating food therein.

In this embodiment, the front chamber 12 is partitioned into the dehydration sub-chambers 122 by at least one partition wall 121 which prevents air flowing in one of the dehydration sub-chambers 122 from entering into the other one of the dehydration sub-chambers 122. In the embodiment shown in FIG. 3, the front chamber 12 is partitioned by two partition walls 121 into three dehydration sub-chambers 122, and the food dehydrator includes three food trays 13 which can be removably and respectively disposed in the three dehydration sub-chambers 122. In practice, the number of the dehydration sub-chambers 122, as well as the number of the food trays 13, may vary depending on requirements.

Figure 5:
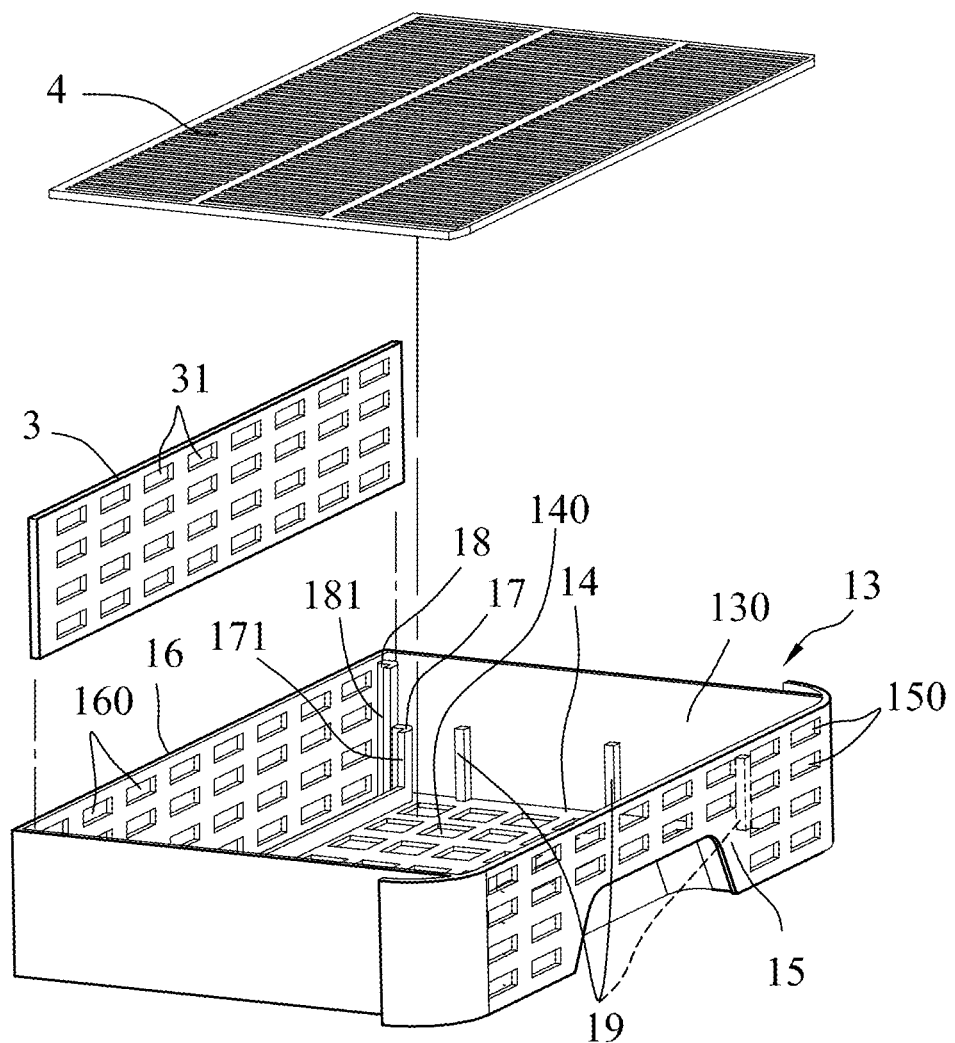
FIG. 5 is a schematic view illustrating a shutter panel, a screen plate, and a food tray used in the food dehydrator shown in FIG. 3.

As shown in FIGS. 4 and 5, each of the food trays 13 has a bottom wall 14, a front wall 15, and a rear wall 16. The bottom wall 14, the front wall 15, and the rear wall 16 cooperatively define an accommodation space 130 thereamong. The bottom wall 14 extends in the longitudinal direction (X) to terminate at a front edge 141 and a rear edge 142. The front wall 15 extends upwardly from the front edge 141. The rear wall 16 extends upwardly from the rear edge 142. Each of the front and rear walls 15, 16 has a plurality of through holes 150, 160 for passage of the introduced air. In this embodiment, the bottom wall 14 has a plurality of through holes 140 in fluid communication with the accommodation space 130. In this case, the food items placed on the bottom wall 14 can be efficiently dried and heated.

In other embodiments, the partition walls 121 are not provided, and guide rails (not shown) are provided in the front chamber 12 for guiding movement of the food trays 13. In this case, the bottom wall 14 of each of the food trays 13 is not provided with the through holes 140, and each of the food trays 13 defines, in cooperation with a corresponding pair of the guide rails, the corresponding one of the dehydration sub-chambers 122.

As shown in FIG. 3, the food dehydrator further includes a base frame 2, and the blower unit 21 further includes an air intake pipe 211. The base frame 2 has a front frame wall 201, a rear frame wall 202 opposite to the front frame wall 201 in the longitudinal direction (X), and a seat plate 203. The front and rear frame walls 201, 202 cooperatively define a base chamber 20 therebetween (see FIG. 4), and the blower member 212 is disposed in the base chamber 20. The seat plate 203 is configured to permit the housing 1 to be disposed thereon, and interconnects the front and rear frame walls 201, 202. The air intake pipe 211 is disposed in the base chamber 20 downstream of the blower member 212 and upstream of the air intake port 10 so as to introduce the air to the rear chamber 11.

In this embodiment, the food dehydrator further includes a plurality of heating members 22 and a control panel 23 mounted on the front frame wall 201. Each of the heating members 22 is disposed in the rear chamber 11 immediately upstream of the internal port 123 of the corresponding one of the dehydration sub-chambers 122 so as to heat the introduced air immediately before the introduced air flows through the internal port 123 of the corresponding one of the dehydration sub-chambers 122. The heating members 22 may be any conventional heating members, such as heat tubes, electrical heating members, etc.

The control panel 23 is electrically connected to the heating members 22 so as to adjust temperatures of the heating members 22, respectively, whereby the food items placed on different food trays 13 can be heated by air streams of different temperatures. The control panel 23 may have a plurality of adjusting members 231 for adjusting the temperatures of the heating members 22, respectively. In this embodiment, the control panel 23 further has a touch screen 232 and the adjusting members 231 are in the form of three control icons on the touch screen 232 for pressing by a user to adjust the temperatures of the heating members 22. In other embodiments, each of the adjusting members 231 may be in the form of a knob or button.

In use, food items, such as vegetable or fruit slices, are placed in the accommodation space 130 of each of the food trays 13, and the food trays 13 are then put into the dehydration sub-chambers 122, respectively. Thereafter, the blower member 212 and the heating members 22 are actuated so that air is introduced into the rear chamber 11 and is heated by the heating members 22. The heated air flows through the food trays 13 in each of the sub-chambers 122 to dry the food items while carrying away water moisture from the food items. Due to the configuration of the partition walls 121 and the food trays 13 in this embodiment, air flowing into the accommodation space 130 of each of the food trays 13 can only flow out through the through holes 150 in the front wall 15 of the corresponding one of the food trays 13. Therefore, even if the food trays 13 are used to dehydrate different food items, their flavors will not mix.

Figure 8:
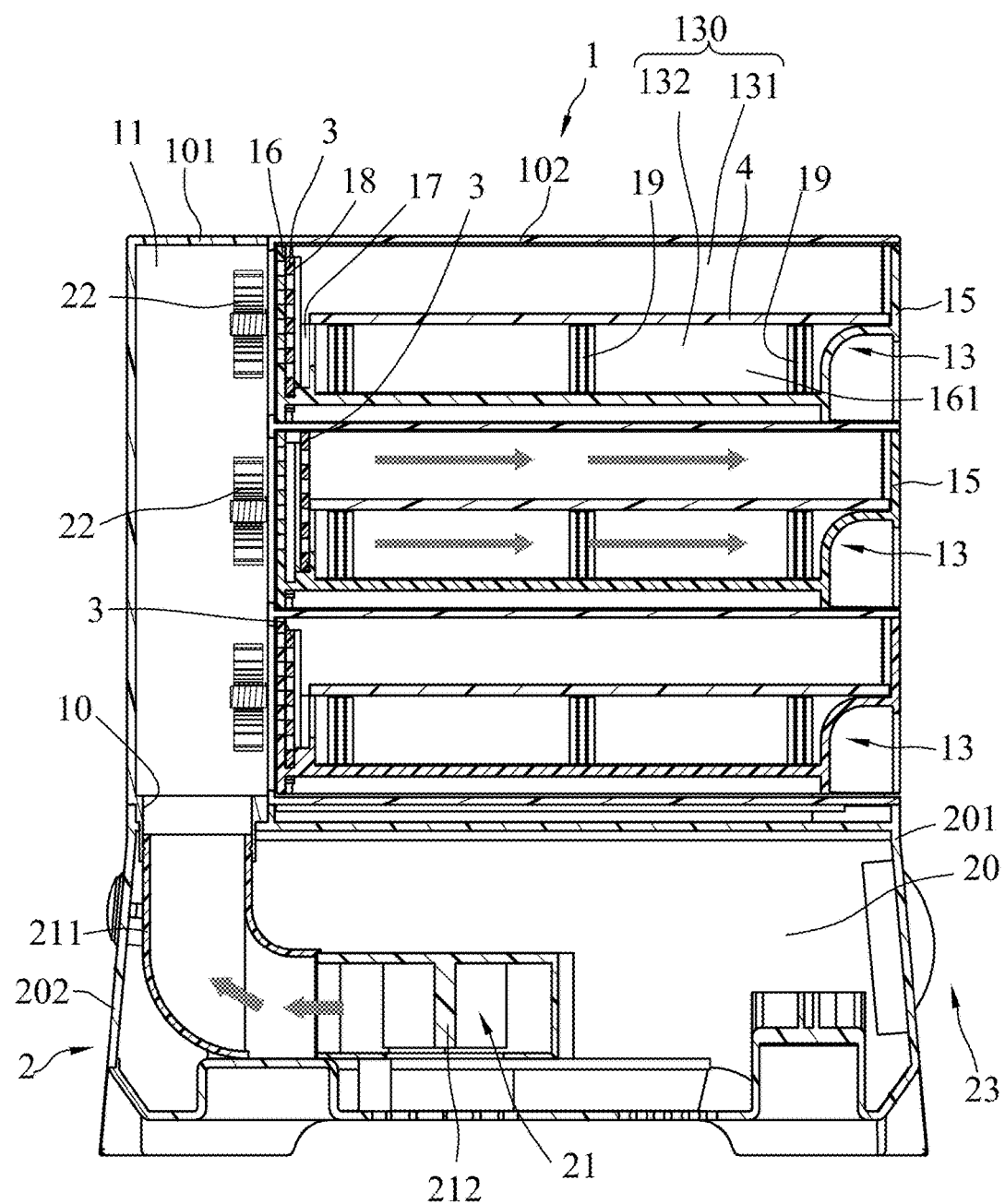
FIG. 8 is similar to FIG. 4 but illustrating one of the shutter panels in the open position and two of the shutter panels in the closed position.

As shown in FIGS. 5 and 8, the food dehydrator includes at least one shutter panel 3 configured to block the through holes 160 of the rear wall 16 of one of the food trays 13.

In this embodiment, the shutter panel 3 is provided in each of the food trays 13, and has patterned holes 31 configured to match the through holes 160 of the rear wall 16 of each of the food trays 13. Of course, the user can optionally purchase one or more of the shutter panels 3 depending on the user's needs. When the shutter panel 3 is displaced to an open position (FIG. 7), the patterned holes 31 are in register with the through holes 160 of the rear wall 16 of the corresponding food tray 13. When the shutter panel 3 is displaced to a closed position (FIG. 6), the through holes 160 of the rear wall 16 of the corresponding food tray 13 are completely closed by the shutter panel 3. As shown in FIG. 8, when only one of the food trays 13 is used for dehydration, the shutter panel 3 in the corresponding food tray 13 is in the open position, while the shutter panels 3 in the two food trays 13 not in use are in the closed position.

Figure 7:
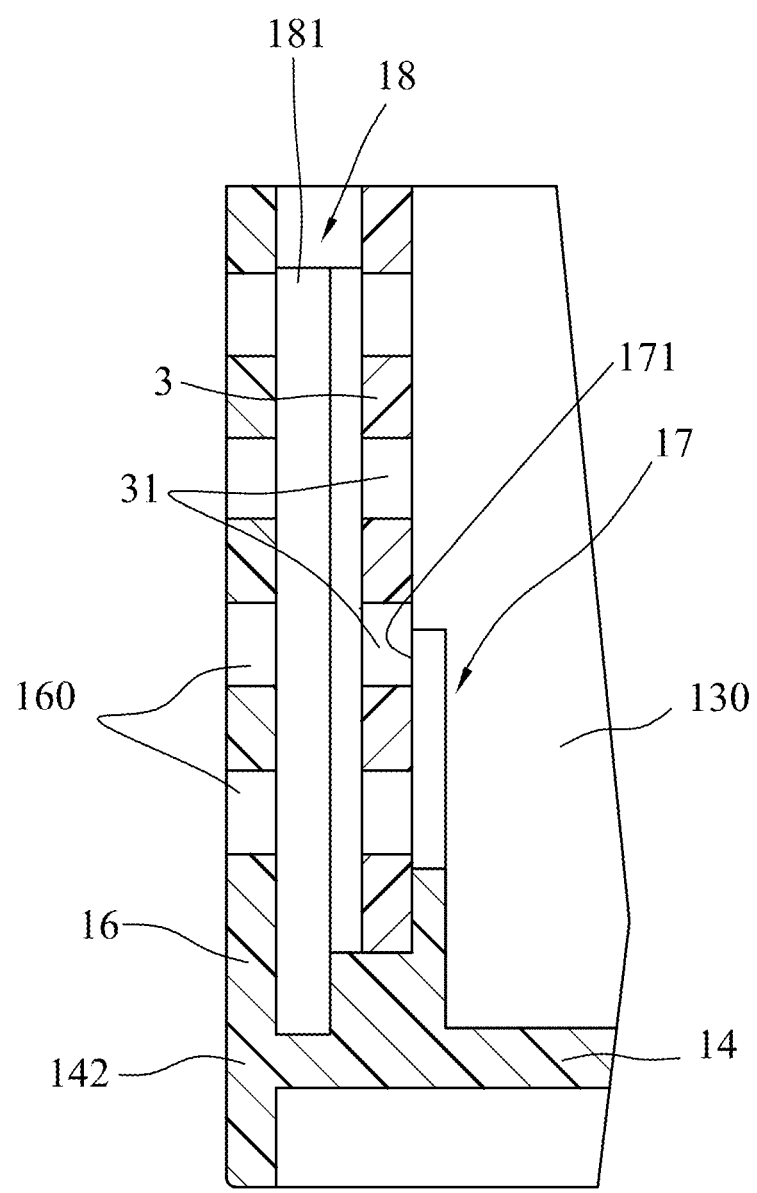
FIG. 7 is similar to FIG. 6 but illustrating the shutter panel in an open position.

In this embodiment, a first retaining member 17 and a second retaining member 18 are disposed inside the accommodation space 130 of each of the food trays 13. The first retaining member 17 has two segments 171 (only one is shown in FIG. 5) for retaining a corresponding one of the shutter panels 3 in the open position. As shown in FIG. 7, in the open position, the shutter panel 3 is retained by the segments 171 of the first retaining member 17 to be spaced apart from the rear wall 16 of the corresponding one of the food trays 13.

Figure 6:
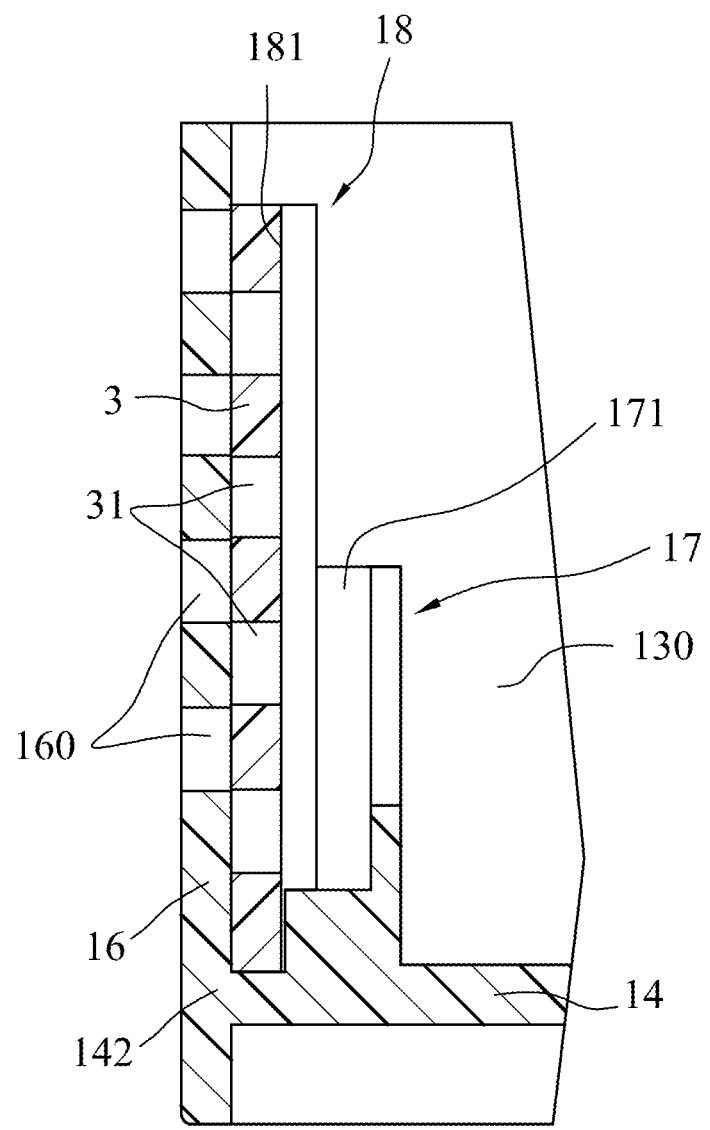
FIG. 6 is a fragmentary enlarged cross-sectional view illustrating the shutter panel in a closed position.

The second retaining member 18 has two segments 181 (only one is shown in FIG. 5) for retaining the corresponding one of the shutter panels 3 in the closed position. As shown in FIG. 6, in the closed position, the shutter panel 3 abuts against the rear wall 16 of the corresponding one of the food trays 13, and the patterned holes 31 of the shutter panel 3 are staggered from the through holes 160 of the rear wall 16 of the corresponding one of the food trays 13.

With reference to FIGS. 5 and 8, the food dehydrator further includes a plurality of screen plates 4. Each of the screen plates 4 is configured to span between the front and rear walls 15, 16 of the corresponding one of the food trays 13 so as to divide the accommodation space 130 of the corresponding one of the food trays 13 into two sub-spaces 131, 132. Of course, the user can optionally purchase one or more of the screen plates 4 depending on the user's needs.

Furthermore, a plurality of spaced supports 19 are formed inside the accommodation space 130 of each of the food trays 13, and are configured to support a corresponding one of the screen plates 4. In this embodiment, six of the spaced supports 19 are symmetrically formed inside the accommodation space 130 of each of the food trays 13, in which three of the spaced supports 19 are disposed along a right edge of the bottom wall 14 and the other three of the spaced supports (not shown) are disposed along a left edge of the bottom wall 14.

Figure 9:
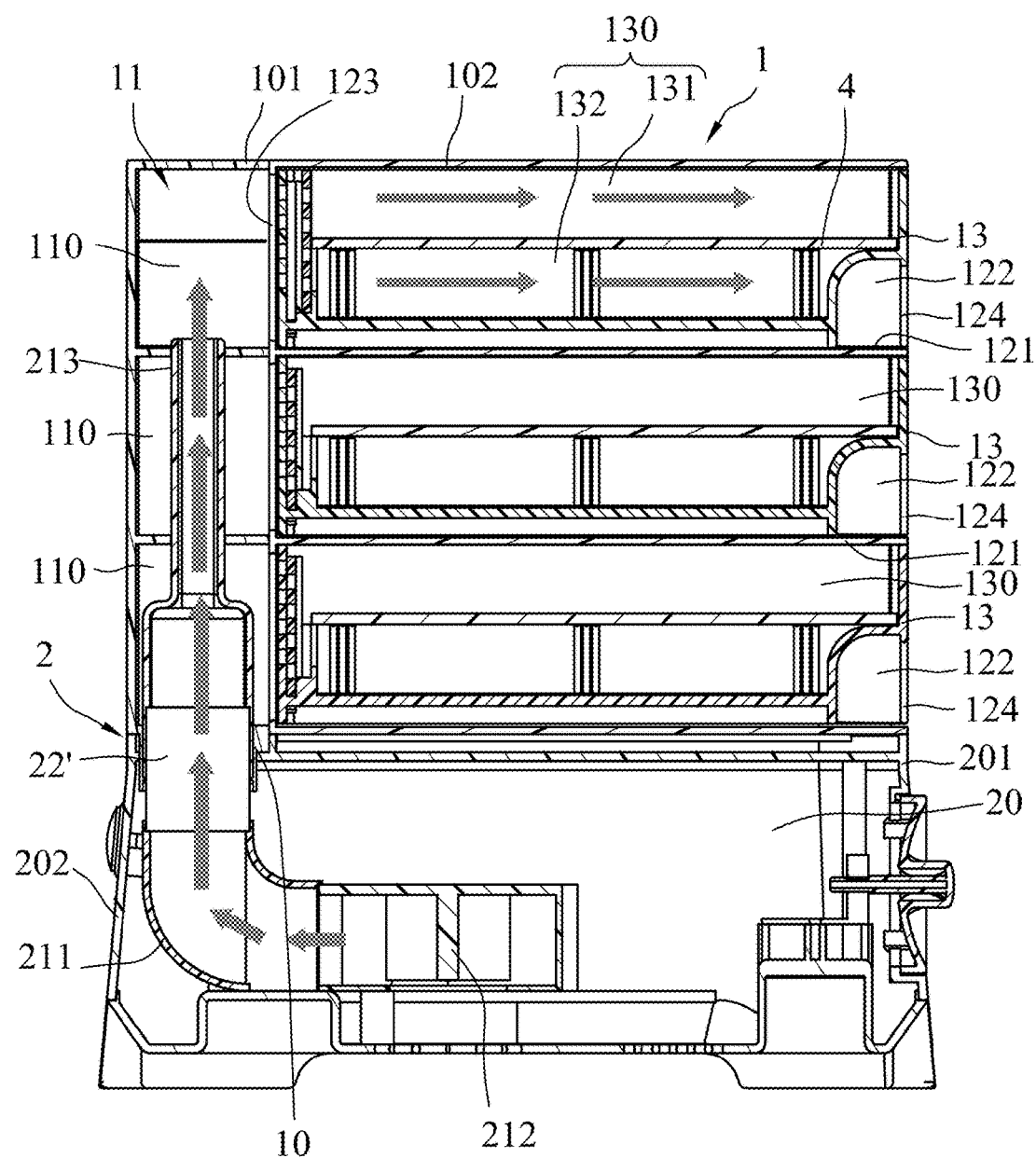
FIG. 9 is a cross-sectional view of a food dehydrator according to a second embodiment of the disclosure.
Figure 10:
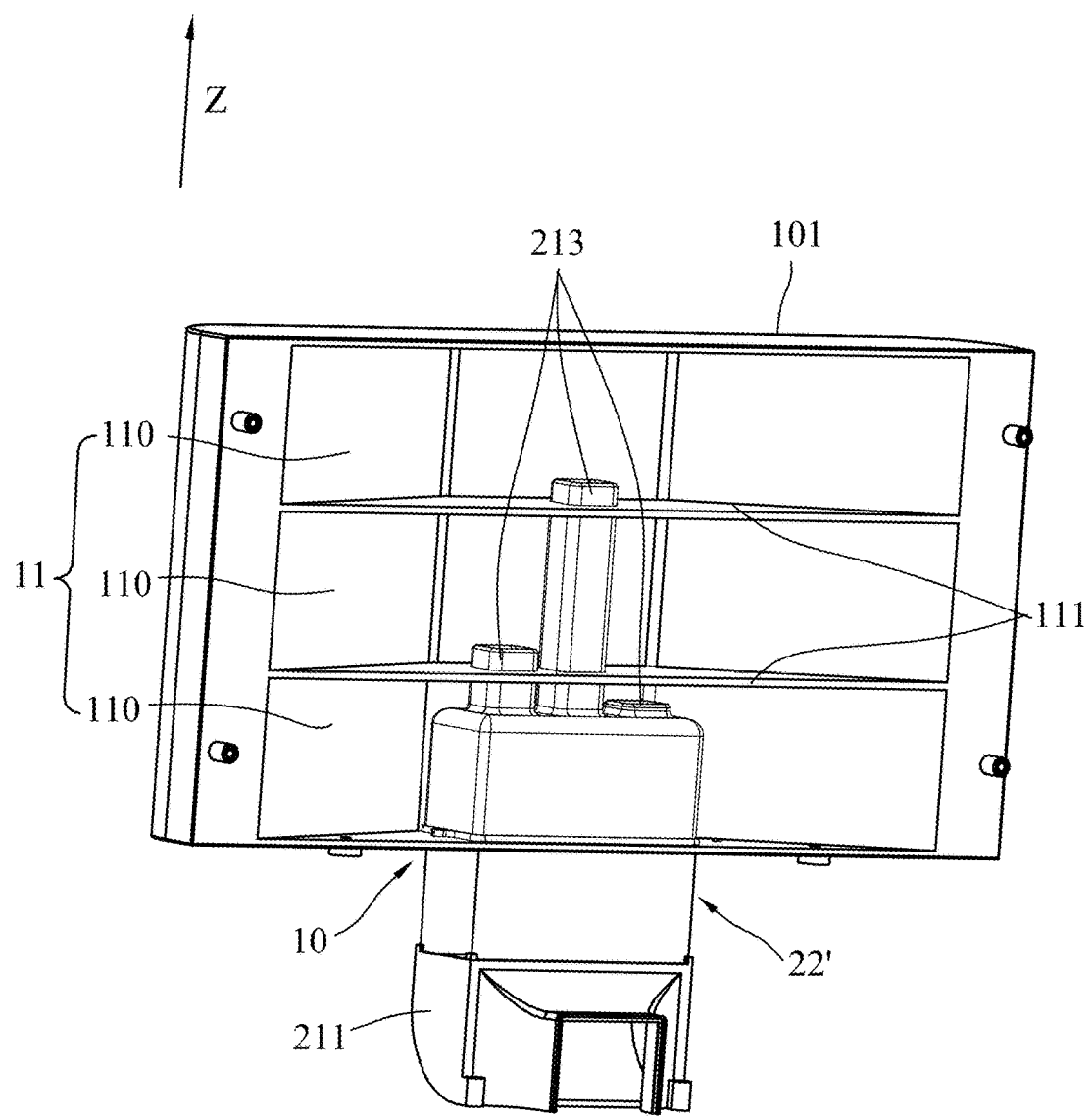
FIG. 10 is a schematic view illustrating a plurality of connecting pipes of the food dehydrator according to the second embodiment of the disclosure.

FIGS. 9 and 10 illustrate a food dehydrator according to a second embodiment of the disclosure. The second embodiment is similar to the first embodiment except that in the second embodiment, the rear chamber 11 is partitioned by at least one partition wall 111 into a plurality of rear sub-chambers 110, and the food dehydrator further includes a plurality of connecting pipes 213.

The rear sub-chambers 110 are displaced from one another in the upright direction (Z), and are in non-communication with each other in the upright direction (Z). The rear sub-chambers 110 are in fluid communication with the dehydration sub-chambers 122, respectively.

Each of the connecting pipes 213 is disposed downstream of the air intake port 10 and upstream of a corresponding one of the rear sub-chambers 110 such that the introduced air is distributed into the rear sub-chambers 110 through the connecting pipes 213, respectively.

In this embodiment, the food dehydrator further includes a heater 22' disposed downstream of the air intake pipe 211 and upstream of the connecting pipes 213 so as to heat the introduced air before the introduced air is distributed into the rear sub-chambers 122. Because only one heater 22' is used in the second embodiment, the food items in each of the food trays 13 can be dried at substantially the same temperature.

Figure 11:
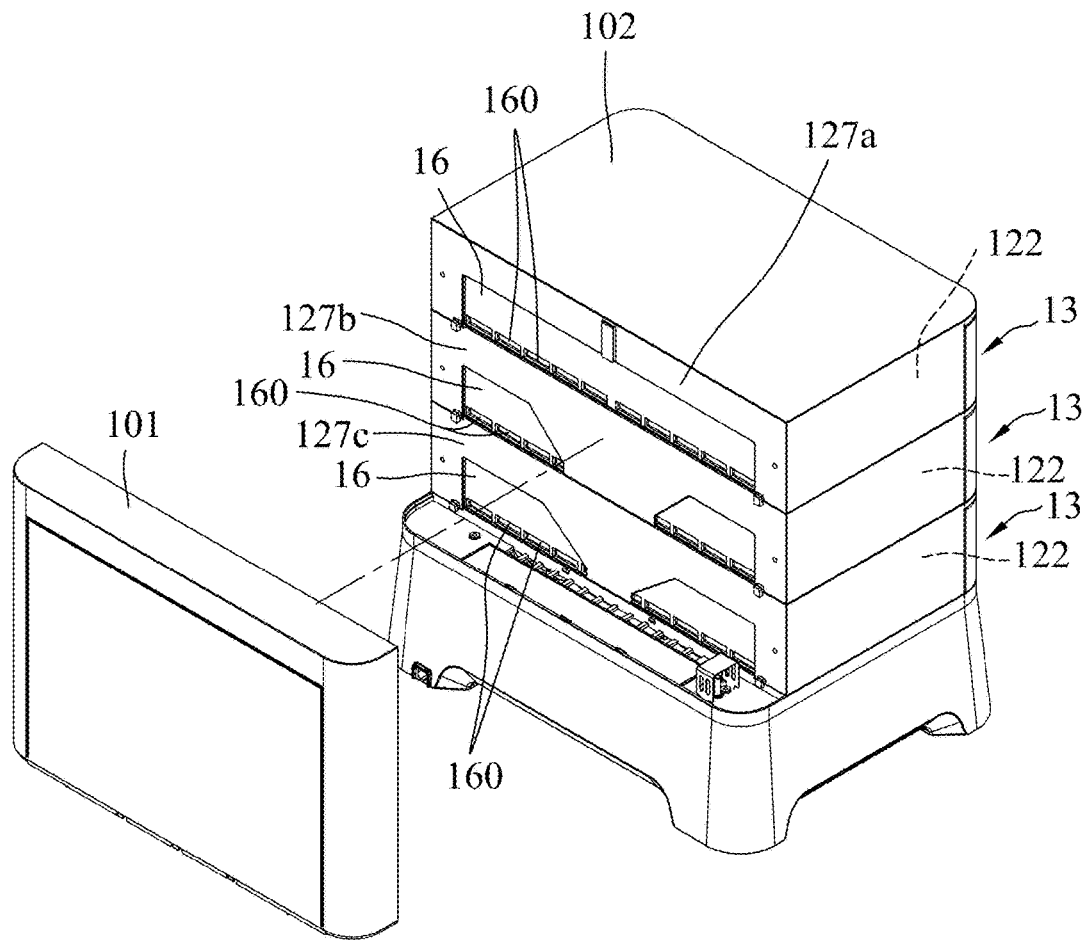
FIG. 11 a partial exploded perspective view of a food dehydrator according to a third embodiment of the disclosure.
Figure 12:
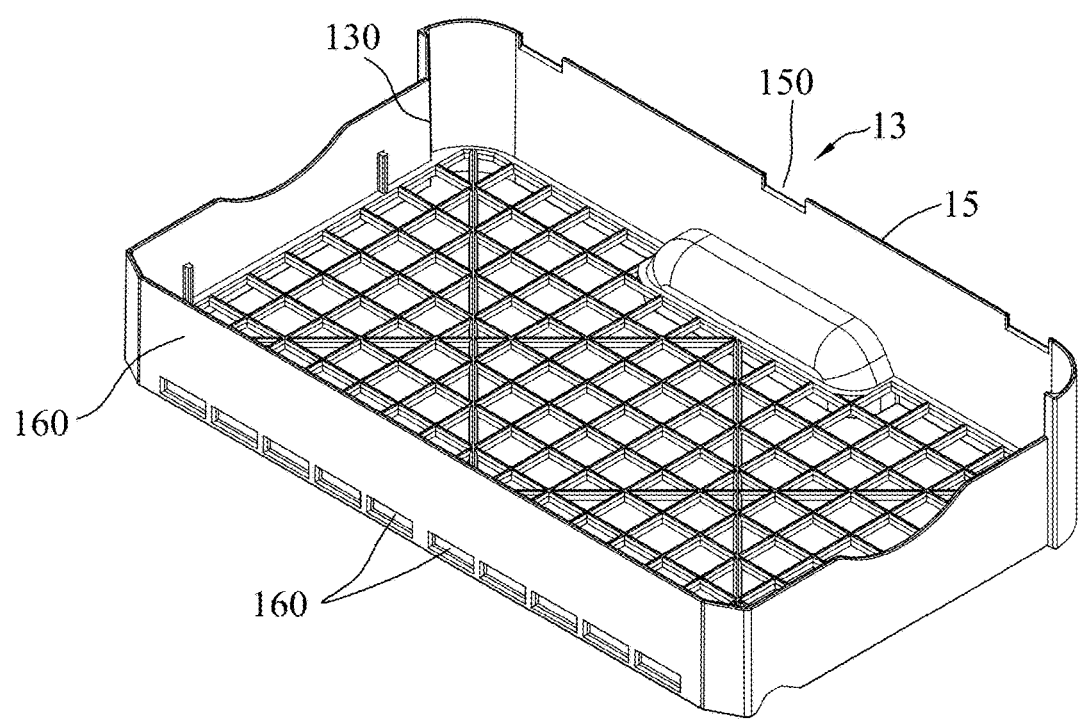
FIG. 12 is a schematic view illustrating a food tray used in the food dehydrator shown in FIG. 11.
Figure 13:
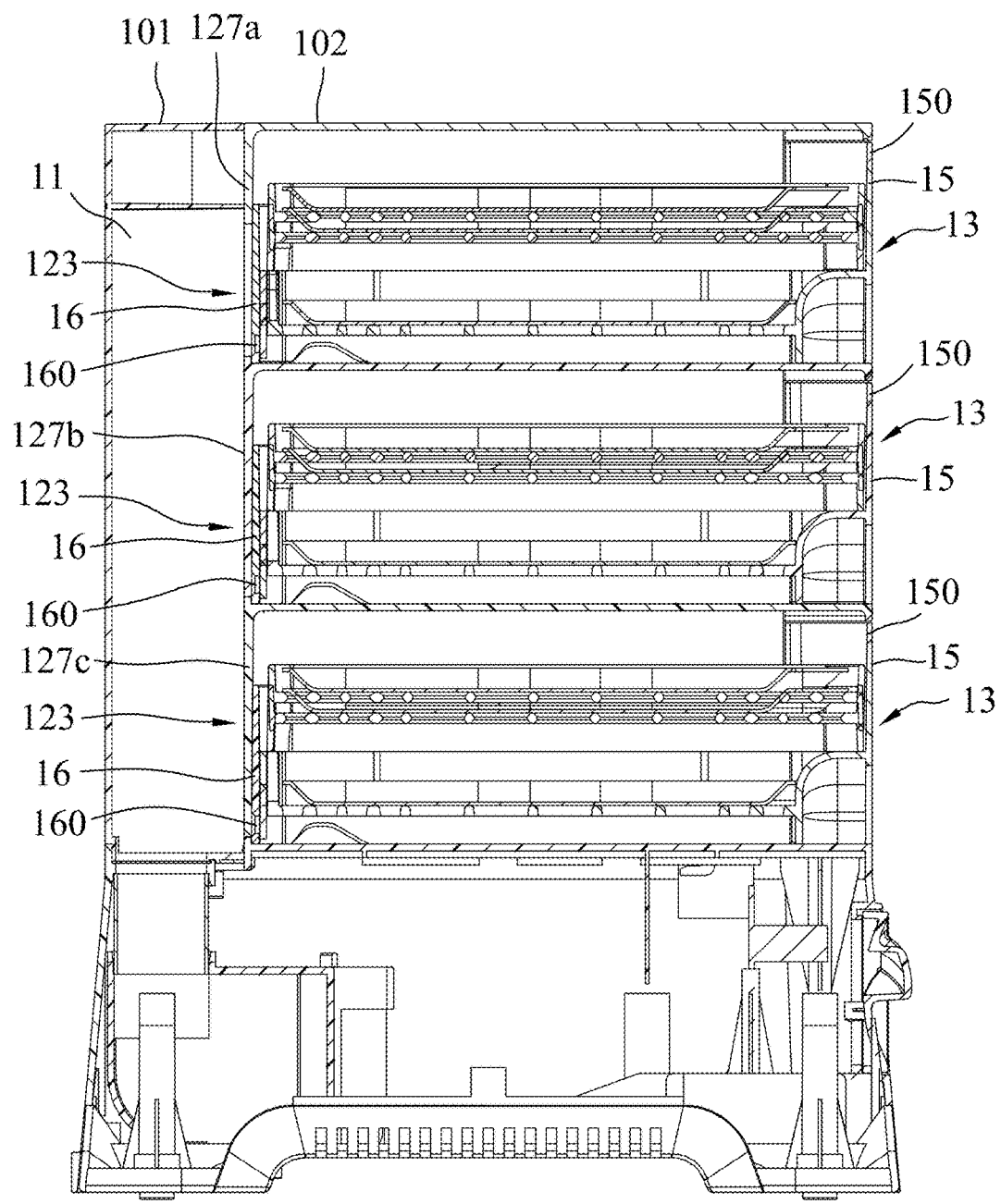
FIG. 13 is a cross-sectional view of the food dehydrator according to the third embodiment of the disclosure.

FIGS. 11 to 13 illustrate a food dehydrator according to a third embodiment of the disclosure. The third embodiment is similar to the first embodiment except that in the third embodiment, (i) the rear wall 16 has a plurality of rear through holes 160 located proximate to the bottom wall 14 for passage of the introduced air, (ii) the front wall 15 has a front through hole 150 located distal from the bottom wall 14, and (iii) three blocking members 127a, 127b, 127c are further provided.

When no blocking member is provided, it is found that the introduced air is not evenly distributed into the three dehydration sub-chambers 122. The volumetric flow rate passing through the upper one of the dehydration sub-chambers 122 is smallest, and the volumetric flow rate passing through the middle one of the dehydration sub-chambers 122 is largest. Therefore, as shown in FIG. 11, the blocking members 127b, 127c are provided to respectively block some of the rear through holes 160 of the lower two of the food trays 13 so as to permit the introduced air to be evenly distributed into the dehydration sub-chambers 122. In this embodiment, the blocking member 127a does not block any rear through holes 160.

In addition, because the rear through holes 160 are located proximate to the bottom wall 14 and the front through hole 150 is located distal from the bottom wall 14, the introduced air (hot air) introduced into each of the food trays 13 flows through the rear through holes 160 into the accommodation space 130 and then flows upward to leave the accommodation space 130 through the front through hole 150. Therefore, food items placed in the accommodation space 130 of each of the food trays 13 can be evenly heated and dried.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A food dehydrator comprising:
a housing having
an air intake port,
a rear chamber disposed downstream of said air intake port and extending in an upright direction, and
a front chamber disposed forwardly of said rear chamber, and having a plurality of dehydration sub-chambers which are displaced from each other in the upright direction, each of said dehydration sub-chambers having an internal port disposed downstream of said rear chamber and an outlet port for exhaust to the atmosphere, said outlet port being opposite to said internal port in a longitudinal direction transverse to the upright direction, and being disposed downstream of said internal port;
a blower member disposed upstream of said air intake port for introducing air into said rear chamber; and
a plurality of food trays each being removably disposed in a corresponding one of said dehydration sub-chambers, and each being configured to permit the introduced air, which flows through said internal port of the corresponding one of said dehydration sub-chambers, to pass therethrough and leave through said outlet port of the corresponding one of said dehydration sub-chambers.

2. The food dehydrator according to claim 1, further comprising:
a base frame having a front frame wall and a rear frame wall opposite to said front frame wall in the longitudinal direction, said front and rear frame walls cooperatively defining a base chamber therebetween, said blower member being disposed in said base chamber; and an air intake pipe disposed in said base chamber downstream of said blower member and upstream of said air intake port so as to introduce the air into said rear chamber.

3. The food dehydrator according to claim 2, wherein said base frame has a seat plate which interconnects said front and rear frame walls, and which is configured to permit said housing to be disposed thereon.

4. The food dehydrator according to claim 2, further comprising a plurality of heating members each being disposed in said rear chamber immediately upstream of said internal port of the corresponding one of said dehydration sub-chambers so as to heat the introduced air immediately before the introduced air flows through said internal port of the corresponding one of said dehydration sub-chambers.

5. The food dehydrator according to claim 4, further comprising a control panel which is disposed on said front frame wall and which is configured to permit adjustment of temperatures of said heating members, respectively.

6. The food dehydrator according to claim 2, wherein said rear chamber is partitioned into a plurality of rear sub-chambers which are displaced from one another in the upright direction, and which are in non-communication with each other in the upright direction, said rear sub-chambers being in fluid communication with said dehydration sub-chambers, respectively, said food dehydrator further comprising a plurality of connecting pipes each being disposed downstream of said air intake port and upstream of a corresponding one of said rear sub-chambers such that the introduced air is distributed into said rear sub-chambers through said connecting pipes, respectively.

7. The food dehydrator according to claim 6, further comprising a heater disposed downstream of said air intake pipe and upstream of said connecting pipes so as to heat the introduced air before the introduced air is distributed into said rear sub-chambers.

8. The food dehydrator according to claim 1, wherein each of said food trays has a bottom wall extending in the longitudinal direction to terminate at a front edge and a rear edge, a front wall extending upwardly from said front edge, and a rear wall extending upwardly from said rear edge, each of said front and rear walls having a plurality of through holes for passage of the introduced air, said bottom wall, said front wall, and said rear wall cooperatively defining an accommodation space thereamong.

9. The food dehydrator according to claim 8, further comprising at least one shutter panel configured to block said through holes of said rear wall of one of said food trays.

10. The food dehydrator according to claim 9, wherein said shutter panel has patterned holes configured to match said through holes of said rear wall of each of said food trays such that when said shutter panel is displaced to an open position, said patterned holes are in register with said through holes of said rear wall of said one of said food trays, and such that when said shutter panel is displaced to a closed position, said through holes of said rear wall of said one of said food trays are completely closed by said shutter panel.

11. The food dehydrator according to claim 8, further comprising a plurality of screen plates each being configured to span between said front and rear walls of a corresponding one of said food trays so as to divide said accommodation space of the corresponding one of said food trays into two sub-spaces.

12. The food dehydrator according to claim 1, wherein said front chamber is partitioned by at least one partition wall into said dehydration sub-chambers.

13. The food dehydrator according to claim 1, wherein each of said food trays has a bottom wall extending in the longitudinal direction to terminate at a front edge and a rear edge, a front wall extending upwardly from said front edge, and a rear wall extending upwardly from said rear edge, said rear wall having a plurality of rear though holes for passage of the introduced air, said front wall having a front through hole, said bottom wall, said front wall, and said rear wall cooperatively defining an accommodation space thereamong.

14. The food dehydrator according to claim 13, further comprising at least one blocking member disposed to block at least one of said rear though holes of at least one of said food trays so as to permit the introduced air to be evenly distributed into said dehydration sub-chambers.

15. The food dehydrator according to claim 13, wherein said front through hole is located distal from said bottom wall and said rear though holes are located proximate to said bottom wall.

16. A food dehydrator comprising:
 a housing having
  an air intake port,
  a rear chamber disposed downstream of said air intake port, and
  a front chamber disposed forwardly of said rear chamber, and having a plurality of dehydration sub-chambers, each of said dehydration sub-chambers having an internal port disposed downstream of said rear chamber and an outlet port for exhaust to the atmosphere, said outlet port being opposite to said internal port, and being disposed downstream of said internal port;
 a blower member disposed upstream of said air intake port for introducing air into said rear chamber; and
 a plurality of food trays each being removably disposed in a corresponding one of said dehydration sub-chambers, and each being configured to permit the introduced air, which flows through said internal port of the corresponding one of said dehydration sub-chambers, to pass therethrough and leave through said outlet port of the corresponding one of said dehydration sub-chambers, each of said food trays defining accommodation space and including a bottom wall which has a plurality of through holes in fluid communication with said accommodation space.

17. The food dehydrator according to claim 16, wherein said bottom wall has a front edge and a rear edge, each of said food trays further including a front wall extending upwardly from said front edge, and a rear wall extending upwardly from said rear edge, said rear wall having at least one rear though holes for passage of the introduced air, said front wall having at least one front through hole, said rear and front through holes being located in different height relative to said bottom wall.

18. The food dehydrator according to claim 17, wherein said rear wall has a plurality of said rear through holes located proximate to said bottom wall, and said front through hole is located distal from said bottom wall.

19. The food dehydrator according to claim 18, further comprising at least one blocking member disposed to block at least one of said rear though holes of at least one of said food trays so as to permit the introduced air to be evenly distributed into said dehydration sub-chambers.

20. The food dehydrator according to claim 16, wherein said front chamber is partitioned into said dehydration sub-chambers by at least one partition wall which prevents air flowing in one of said dehydration sub-chambers from entering into the other one of said dehydration sub-chambers.

* * * * *

UNITED STATES PATENT AND TRADEMARK OFFICE
CERTIFICATE OF CORRECTION

PATENT NO. : 9,801,406 B2  
APPLICATION NO. : 15/175823  
DATED : October 31, 2017  
INVENTOR(S) : Chungho Pan et al.

Page 1 of 1

It is certified that error appears in the above-identified patent and that said Letters Patent is hereby corrected as shown below:

Item (30), insert --Foreign Application Priority Data, June 9, 2015 (CN) 201510311611.2--

Signed and Sealed this  
Seventh Day of August, 2018

Andrei Iancu  
*Director of the United States Patent and Trademark Office*